United States Patent [19]

Pluenneke et al.

[11] 4,007,794
[45] Feb. 15, 1977

[54] TOP DESICCATION OF CROP PLANTS

[75] Inventors: Ricks H. Pluenneke, Forth Worth, Tex.; Willis G. Dykes, Vicksburg, Miss.

[73] Assignee: Lasco, Inc., Vicksburg, Miss.

[22] Filed: Jan. 29, 1976

[21] Appl. No.: 653,542

[52] U.S. Cl. .................................... 171/1; 47/1.3
[51] Int. Cl.² ............... A01M 21/00; A01D 91/00
[58] Field of Search ................. 47/1, 1.3, 1.44; 126/271.2 R–271.2 C; 171/1, 43

[56] References Cited

UNITED STATES PATENTS

| 2,007,383 | 7/1935 | Opp | 47/1.3 |
| 3,183,650 | 5/1965 | Ferris | 47/1.3 X |
| 3,626,636 | 12/1971 | Wheeler | 47/1.44 X |

*Primary Examiner*—Robert E. Bagwill
*Attorney, Agent, or Firm*—Cushman, Darby & Cushman

[57] ABSTRACT

The above-ground growth of potatoes and like root crops are contacted with high voltage electricity several days prior to harvesting, the electricity desiccating the above-ground portion of the crops while not harming the tubers. A no-load voltage of about 20 kv with an energy density of about 11–15 kw/foot of width treated is effective. Low-bush blueberries, and like perennial crops, are pruned by contacting the above-ground growth thereof with electricity. Pruning, in the case of blueberries, is most effective when done approximately every other year in the case of blueberries, a no-load voltage of 10–20 kv with an energy density of about 2–3 kw/foot of width treated being effective.

7 Claims, No Drawings

TOP DESICCATION OF CROP PLANTS

BACKGROUND AND SUMMARY OF THE INVENTION

The invention relates to a method of killing mature root crop tops prior to harvesting, and to a method of pruning certain perennial crop plants, with minimum adverse impact on the environment. In the past it has been proposed to kill plants with electricity, as shown in U.S. Pat. Nos. 2,007,383, 2,607,165, 2,632,285, 3,543,488, and 3,559,337. It has not previously been recognized, however, that certain root crops can be contacted with electricity to destroy the above-ground portions thereof while not adversely affecting the tubers — the crop portion — thereof. This has been recognized according to the present invention, however, and may be utilized to facilitate the harvesting of potatoes, beets, carrots, onions, and the like. According to the present invention, some time before harvesting, after the crops to be harvested are substantially mature, the above ground growth of the crops is contacted with electricity from a high-voltage source, which causes desiccation thereof; for instance for potatoes, the above ground growth is contacted with electricity from a 20 kv source about 10–20 days prior to harvesting, and by the time for harvesting the skin of the potatoes has become more firm, the potatoes are not subject to disease (i.e. leaf roll), and harvesting thereof with conventional equipment is greatly facilitated.

In the past, it has been known to kill the above-ground growth of some root crops — i.e. potatoes — prior to harvesting to facilitate the harvesting and firm the skin thereof, but past methods have had a number of drawbacks. For instance, when conventional chemicals are used to kill the above-ground growth, they can and do leave residues which might migrate to the food portion of the crop, and in any event are retained in the soil to some extent and can be assimilated by the next year's crop; if the chemicals are applied too closely to a time when it rains, they may be washed off before they can be effective for killing the above-ground growth and thus a complete wasteful repeat of the application is necessary; dense foliage is not easily penetrated; also; the chemical treatments are often temperature dependent which means that it is not always possible to apply them at the optimum time, and therefore optimum harvesting conditions may not exist. Roto-beating — that is, actual physical destruction of the above-ground growth — also is practiced in addition to or in place of chemical application. While roto-beating avoids some of the problems inherent with chemical treatment, it is fairly energy intensive, and is not as completely successful as is the chemical treatment.

It has also not been previously recognized that certain perennial crops — such as blueberries — can be pruned with the application of high-voltage electricity, but not destroyed. Conventional proposals for the application of electricity to plants, such as the patents mentioned above, do not recognize that a crop plant may not be killed but merely the above-ground growth thereof destroyed by the application of electricity. According to the present invention, blueberries and like perennial crops, may be treated by the application of electricity — from a 20 kv source, for instance — to the above-ground portions thereof every other year to prune the bushes and thereby encourage future growth. Conventionally, pruning of blueberry bushes on a commercial scale is accomplished by burning off of the plants with oilfired burners. While this effectively prunes the plants without serious damage to the root systems, it also destroys much of the organic material in the soil, and is fairly energy intensive.

Thus according to the present invention, the pruning of perennial crops, such as low-bush blueberries, and the destruction of the above-ground growth of root crops, such as potatoes, carrots, onions, and beets, are greatly facilitated by the application of high-voltage electricity to the above-ground portions of the plants. Apparatus such as shown in our U.S. Pat. No. 3,919,806, the disclosure of which is hereby incorporated by reference herein, may be utilized for practicing the method according to the present invention.

It is the primary object of the present invention to provide improved methods for the pruning of certain perennial crops and for facilitating the harvesting of certain root crops, such methods eliminating many of the drawbacks inherent in prior art methods. This and other objects of the invention will become clear from an inspection of the detailed description of the invention, and from the appended claims.

DETAILED DESCRIPTION OF THE INVENTION

According to the present invention, potatoes and other root crops, such as beets, carrots, and onions, are treated by bringing the above-ground portions of the plants into contact with a high-voltage source of electricity. While the exact voltage applied will vary with the soil conditions, type of crop, etc., it has been found that 20 kv (no load) appears to be an ideal voltage for effecting desiccation of the above-ground portions of the crops, while not adversely affecting the root, food portions thereof. An effective energy density of about 11–15 kw/foot width of crop being treated normally results when such a no-load voltage is being used. While 20 kv and an energy density of 11–15 kw/foot have been found to be workable values, the range of each can vary widely and still be effective for accomplishing the desired result. Any voltage and energy density that results in the application of about 250 milliamps or more to the above-ground stems of root crops (i.e. potatoes) is believed effective. A maximum on the voltage and energy density would be that which would apply so much current that the root portion of the crop was adversely affected; however, there appears to be no adverse effect whatsoever when 12 kv with an energy density of about 11–15 kw/ft is utilized.

The following table gives a summary of actual test results for the method of top killing of root crops according to the present invention. Katahdin potato vines in Maine were treated approximately 21 days prior to harvesting, the potatoes being harvested approximately 4 months after planting, and the vine kill rating of the method according to the present invention was determined one day prior to harvest. The kill rating code for the below (and the succeeding) table is 1=no or poor kill of leaves and stems, 2=90% of leaves but poor stem kill, 3=100% of leaves and 40% of stems killed, 4=100% of leaves and 70% of stems killed, and 5=100% of leaves and stems killed. By dragging behind a tractor six 24 inch vertical chains (covering a 16 inch horizontal band) which were electrically energized with AC current, the following results were obtained:

TABLE A

| Voltage (no load) (kv) | (load) | Speed M.P.H. | Current Amps (under load) | Direction | Energy Density (approx. kw/ft) | Vine Kill Ratings |
|---|---|---|---|---|---|---|
| No treatment (control) | | | | | | 1.00 |
| 20 | :12.5 | 0.5 | 1.14 | one | 11 | 3.65 |
| 20 | :12.5 | 0.5 | 1.14 | two | 11 | 4.05 |
| 20 | :12.5 | 1.0 | 1.14 | one | 11 | 3.47 |
| 20 | :12.5 | 1.0 | 1.14 | two | 11 | 3.87 |

There was slight regrowth on all plots, however, this regrowth may — it is believed — be avoided to a large extent by harvesting closer to the date of treatment with the electricity. Treatment with electricity should precede harvesting by 10–20 days.

The values in Table A may be compared with similar values for a variety of chemical treatments of the same type of potatoes grown in the same area in generally the same time span. The results of such chemical treatment are listed below (all applied on days when it did not rain):

TABLE B

| Material | Treatments Lbs. A.I./Acre or product rate/Acre (1st and 2nd - if any- applications) | Additive | Kill ratings Before second application | Before harvesting |
|---|---|---|---|---|
| No treatment | | | 1.0 | 1.0 |
| N252 | 0.25 + 0.25 | 0.50% UBI-1126 | 3.1 | 4.8 |
| N252 | 0.50 + 0.25 | 0.50% UBI-1126 | 3.4 | 4.8 |
| N252 | 0.50 + 0.50 | None | 2.4 | 4.0 |
| N252 | 0.50 + 0.50 | 0.25% UBI-1126 | 3.2 | 4.6 |
| N252 | 0.50 + 0.50 | 0.50% UBI-1126 | 3.4 | 5.0 |
| N252 | 1.00 + 0.50 | None | 2.8 | 4.6 |
| N252 | 1.00 + 0.50 | 0.25% UBI-1126 | 3.4 | 5.0 |
| N252 | 1.00 + 0.50 | 0.50% UBI-1126 | 3.4 | 5.0 |
| N252 | 1.00 + 0.50 | 0.75% UBI-1126 | 3.5 | 5.0 |
| N252 | 1.00 + 0.50 | 1.00% UBI-1126 | 3.7 | 5.0 |
| N252 | 1.00 + 1.00 | None | 2.7 | 4.8 |
| N252 | 1.00 + 1.00 | 0.25% UBI-1126 | 3.4 | 5.0 |
| N252 | 1.00 + 1.00 | 0.50% UBI-1126 | 3.3 | 5.0 |
| N252 | 1.00 + 1.00 | 0.75% UBI-1126 | 3.5 | 5.0 |
| N252 | 1.00 + 1.00 | 1.00% UBI-1126 | 3.6 | 5.0 |
| N252 | 0.50 | 0.50% UBI-1126 | 3.0 | 4.6 |
| N252 | 1.00 | 0.50% UBI-1126 | 3.2 | 4.8 |
| N252 | 2.00 | 0.50% UBI-1126 | 3.0 | 5.0 |
| DNBP | 2.00 + 2.00 | 5 gals No. 2 oil | 3.2 | 4.5 |
| DNBP | 2.00 | 5 gals No. 2 oil | 3.3 | 4.5 |
| Dow General | 2 qts. + 2 qts. | 5 gals No. 2 oil | 3.1 | 4.5 |
| Dow General | 4 qts. + 4 qts. | 5 gals No. 2 oil | 3.6 | 4.9 |
| Dow General | 4 qts. | 5 gals No. 2 oil | 3.8 | 4.2 |
| Premerge | 3 qts. + 3 qts. | 5 gals No. 2 oil 1 pt. emulsifier | 1.9 | 3.8 |
| Premerge | 6 qts. + 6 qts. | 5 gals No. 2 oil 1 pt. emulsifier | 2.9 | 4.2 |
| Premerge | 6 qts. | 5 gals No. 2 oil 1 pt. emulsifier | 2.9 | 3.1 |
| Dow General | 3 pints | 5 gals No. 2 oil | 3.2 | 3.5 |
| Dow General | 3 pints | 5 gals No. 2 oil 1½ pts. Monitor | 3.3 | 3.2 |
| Dow General | 3 pints | 1½ pts. Monitor | 2.0 | 1.7 |
| Des-I-Cate | 2 gallons | 5 gals. No. 2 oil | 3.9 | 3.8 |
| Des-I-Cate | 2 gallons | 5 gals. No. 2 oil 1½ pts. Monitor | 4.2 | 4.1 |
| Des-I-Cate | 2 gallons | 1½ pts. Monitor | 3.6 | 3.8 |
| Evik | 3 pounds | 8 oz. X-77 | 1.3 | 2.4 |
| Evik | 3 pounds | 8 oz. X-77 1½ pts. Monitor | 1.3 | 2.3 |
| Evik | 3 pounds | 1½ pts. Monitor | 1.1 | 1.6 |
| Paraquat | 2 pints | | 3.6 | 3.9 |
| Paraquat | 2 pints | 1½ pts. Monitor | 3.5 | 3.6 |
| Des-I-Cate | 1 gal. | | 2.7 | 2.8 |
| Des-I-Cate | 2 gals. | | 3.4 | 3.6 |
| Des-I-Cate | 1 gal. | 8 oz. X-77 | 2.9 | 3.1 |
| Des-I-Cate | 2 gals. | 8 oz. X-77 | 3.5 | 3.5 |
| Des-I-Cate | 1 gal. | 2 qts. Booster Plus E | 3.6 | 3.5 |
| Des-I-Cate | 1 gal. | 5 gals. No. 2 oil | 3.1 | 2.6 |
| Des-I-Cate | 1 gal. | 1 pt. Paraquat | 3.1 | 3.1 |
| Des-I-Cate | 1 gal. | 2 qts. Oxy-cop | 1.8 | 1.9 |
| Des-I-Cate | 1 gal. | 1 qt. Tronic | 3.4 | 3.5 |
| Des-I-Cate | 1 gal. + 1 gal. | 2 qts. Booster Plus E | 2.8 | 3.7 |
| Des-I-Cate | 2 gals. + 2 gals. | 2 qts. Booster Plus E | 3.6 | 4.5 |
| Des-I-Cate | 1 gal. | 1.0% UBI-1126 | 3.5 | 3.5 |
| Diquat | 2 pts. | | 4.5 | 4.9 |
| Dow General | 1 qt | 5 gals. No. 2 oil | 3.2 | .2 |
| Evik | 2 lbs. | | 1.4 | 1.8 |
| Evik | 2 lbs. | 1.0% UBI-1126 | 2.3 | 3.0 |
| Evik | 2 lbs. | 8 oz. X-77 | 1.6 | 2.3 |
| Diquat | 2 pts. | 2 qts. Booster Plus E | 4.2 | 4.4 |
| Dow General | 3 pts. | 2 qts. Booster Plus E | 2.9 | 3.0 |

TABLE B-continued

| Material | Treatments Lbs. A.I./Acre or product rate/Acre (1st and 2nd - if any- applications) | Additive | Kill ratings Before second application | Before harvesting |
|---|---|---|---|---|
| Des-I-Cate | 1 gal. | 1 qt. Wex | 1.2 | 1.5 |

There was slight regrowth on many plots where the kill was not complete.

It is noted that the effectiveness of the kill with Dow General and Des-I-Cate may be increased through proper application thereof by adjustment of the differential pressure and water dilution (applied with an F.M.C. sprayer) to 5.0 when the differential pressure and water dilution factors are optimized.

It will be seen that treatment with electricity is just as effective as many of the chemical treatments applied above, and additionally has the previously mentioned advantages of no environmental degradation, ready penetration of thick growth, and no adverse effect when it rains or is cold. It is possible to increase the effectiveness of the treatment with electricity by watering down the ground before treatment, or by application of water with ionic materials (i.e. fertilizer salts) therein; this insures no damage to the tubers by allowing the electricity to dissipate to the ground quickly. Also, it is possible to combine the treatment with electricity with chemical treatment (either before or after electrical treatment), diminishing the amount of chemical that must be applied for successful treatment, and allowing one treatment to be made despite the weather conditions.

According to the method of the present invention, low-bush blueberries have been pruned successfully, substantially all of the above-ground growth thereof being killed by contacting the blueberry bushes (or other perennial crop plants) with 10–20 kv (no load) at ground speeds of approximately 3 miles/hour, 2–3 KW of output power per foot of width being provided. This method may be repeated every other year to increase the yield from the plants, no apparent adverse effect on the roots taking place.

While the invention has been herein shown and described in what are presently conceived to be the most practical and preferred embodiments thereof, it will be obvious to one of ordinary skill in the art that many modifications may be made thereof within the scope of the invention, which scope is to be accorded the broadest interpretation of the appended claims so as to encompass all equivalent process and methods.

What is claimed is:

1. A method for facilitating the harvestability of a root crop, such as potatoes, beets, onions, carrots, and the like, comprising the steps of:
   a. allowing said root crop to substantially mature,
   b. contacting the above-ground portions of said root crop with a high-voltage source of electricity so that the above-ground portions of said crop are desiccated but so that the tubular portions thereof are not harmed, and
   c. harvesting said root crop several days after contacting of the above-ground portions of said root crop with high-voltage electricity.

2. A method as recited in claim 1 wherein said root crop is potatoes, and wherein approximately from 11 kw to 15 kw of output power is provided per foot width of potatoes treated, and wherein said root crop is harvested approximately 10–20 days after said above-ground portions of said root crop are contacted with said high-voltage source of electricity.

3. A method as recited in claim 1 comprising the further step of increasing the conductivity of the soil in the area of said root crop prior to contacting the above-ground portions of said root crop with electricity by applying water with ionic materials therein on the soil in the area of said root crop.

4. A method as recited in claim 1 comprising the further step of increasing the conductivity of the soil in the area of said root crop prior to contacting the above-ground portions of said root crop with electricity by applying water on the soil in the area of said root crop.

5. A method as recited in claim 1 comprising the further step of applying a chemical defoliant or the like to said root crop before contacting the top portions of said root crop with electricity.

6. A method as recited in claim 1 comprising the further step of applying a chemical defoliant or the like to said root crop after contacting the top portions of said root crop with electricity, but before harvesting of said crop.

7. A method as recited in claim 1 wherein said crop is potatoes, and wherein at least 250 milli-amperes of current is applied to each stem of said crop.

* * * * *